United States Patent [19]

Eriksson

[11] 4,151,916
[45] May 1, 1979

[54] PACKAGING MATERIALS

[75] Inventor: Sven A. Eriksson, Sodertalje, Sweden

[73] Assignee: AB Anero, Revingegatan, Sweden

[21] Appl. No.: 655,224

[22] Filed: Feb. 4, 1976

Related U.S. Application Data

[63] Continuation of Ser. No. 149,212, Jun. 2, 1971, abandoned.

[30] Foreign Application Priority Data

Jul. 15, 1970 [SE] Sweden .................................. 9842/70

[51] Int. Cl.² ........................ B65D 65/32; B65D 75/58
[52] U.S. Cl. .................................. 206/484; 206/484.2; 206/620; 206/628
[58] Field of Search ............... 206/484, 498, 820, 229; 132/79 R; 229/66, 51 TS

[56] References Cited

U.S. PATENT DOCUMENTS

| 2,053,116 | 9/1936 | Sperry | 229/87 C |
| 2,973,087 | 2/1961 | Rohdin | 206/498 |
| 3,070,102 | 12/1962 | MacDonald | 132/79 R |
| 3,214,013 | 10/1965 | Diamant | 206/820 |
| 3,381,884 | 5/1968 | Herritty | 229/51 TS |
| 3,456,876 | 7/1969 | Repko | 229/66 |

*Primary Examiner*—William T. Dixson, Jr.

[57] ABSTRACT

Foil and sheet material, packages and containers provided with an easily openable tear means. The foil or sheet construction being formed with a layer of weldable material arranged to form a flap and welded along the base line of the flap to provide a reinforced seam.

1 Claim, 8 Drawing Figures

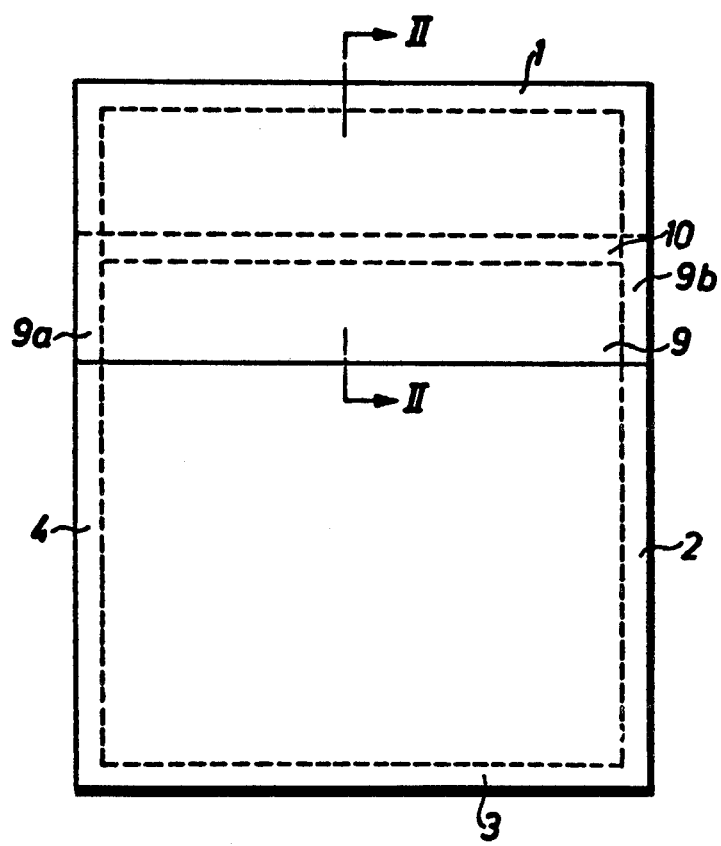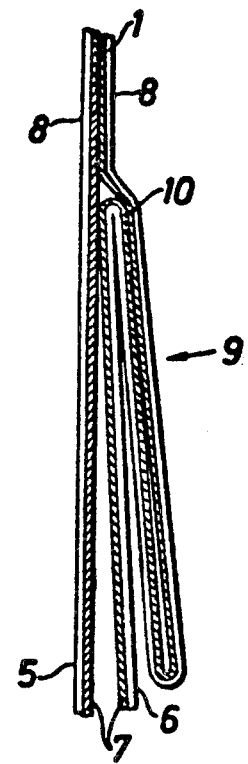

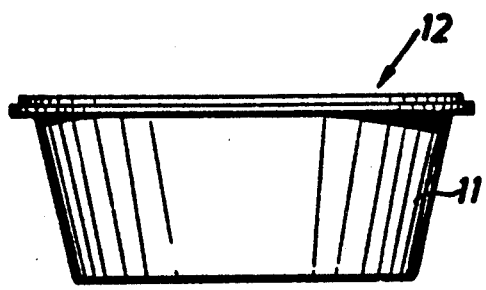
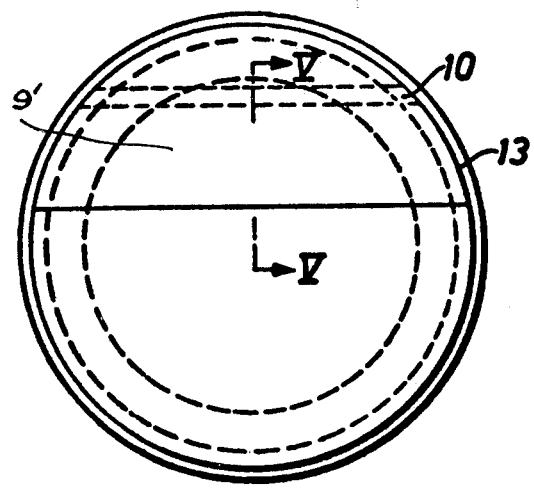
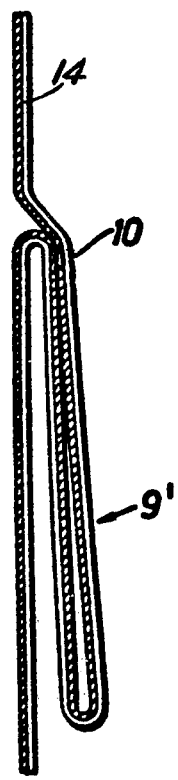

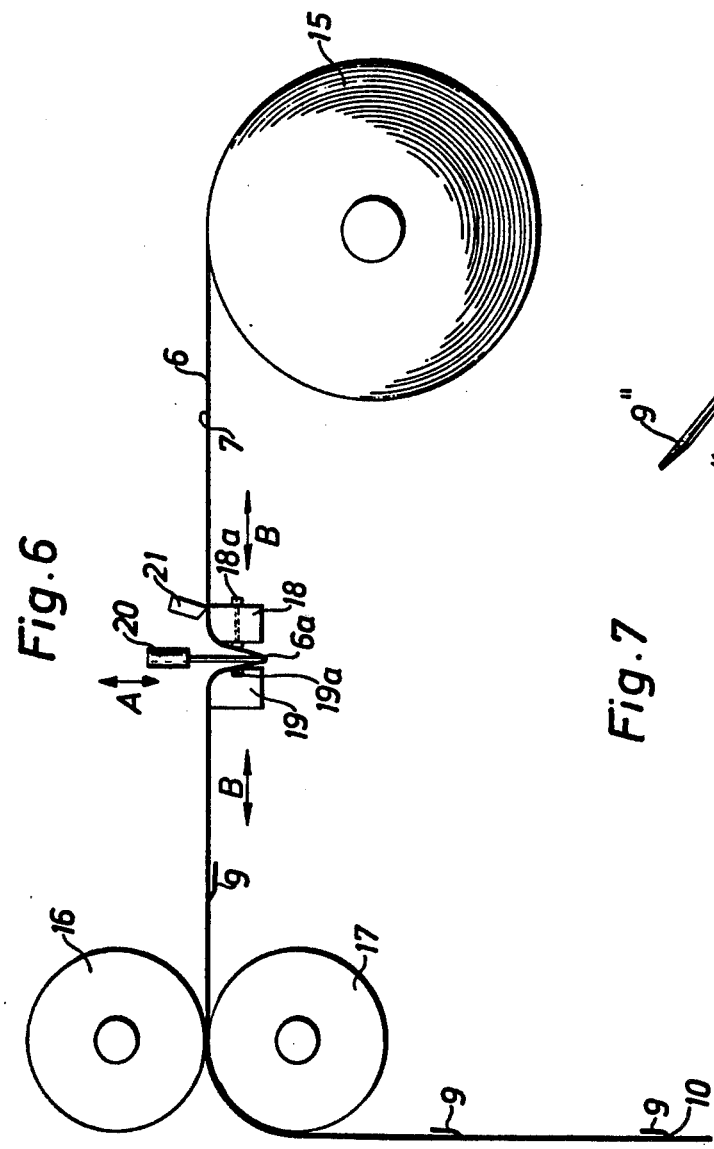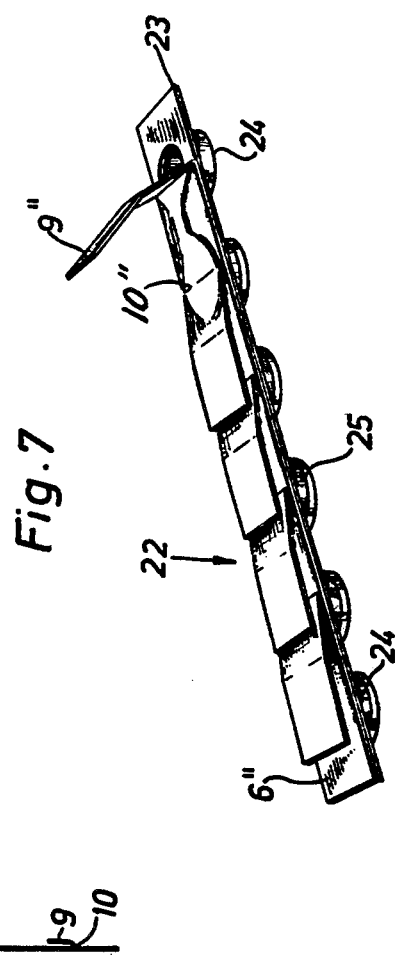

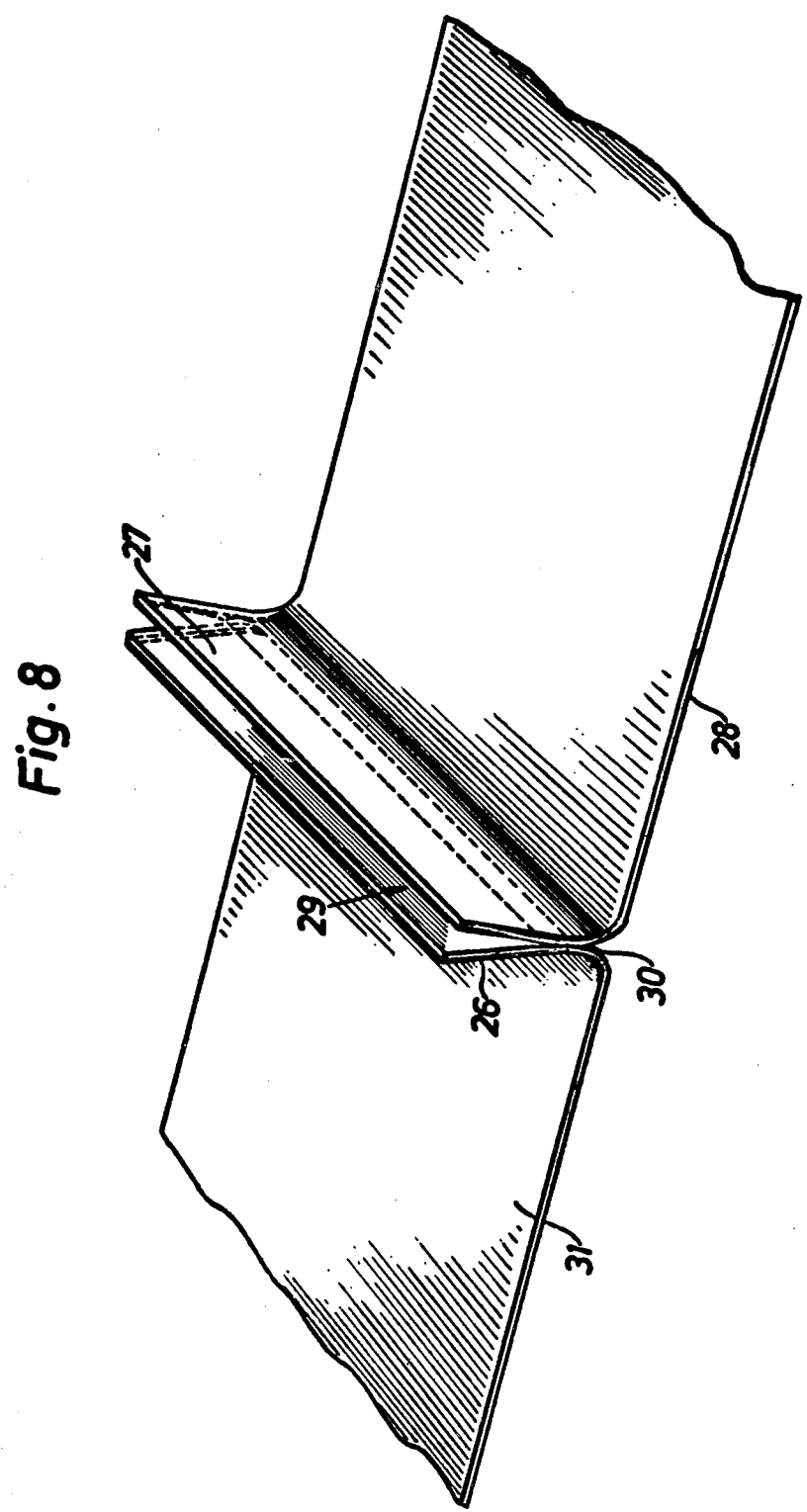

PACKAGING MATERIALS

This is a continuation of application Ser. No. 149,212, filed June 2, 1971 now abandoned, claiming priority for Swedish Pat. Application No. 9842/70 of July 15, 1970 for which all equitable and legal rights are claimed.

BACKGROUND OF INVENTION

The present invention relates to packaging materials and in particular, to a sheet or foil construction from which packages, containers, bags or the like can be formed and to the packages, containers and bags made therefrom.

Plastic material has been used to form packages, containers, etc., for consumer items such as foods, medicines, hardware and other obvious products. As is well known, bags which are sealed in order to protect and keep their products free of contamination, are difficult to open. Various attempts have been made to provide such containers with tear means which are intended to facilitate opening. For obvious reasons such means are always located in the actual sealing weld by which the container is closed, since there would otherwise be considerable risk of leakage or permeability to air, if the tear strip, perforations, or other means were to be placed elsewhere. By placing the tear-means in the sealing weld, however, the container becomes difficult to open as the weld reinforces the strength of the container. The initial force required often is so great that container is destroyed and the contents spilled, or open to contamination. Furthermore, such means always entail the sealing of the material to both sides or walls of the container which requires the use of special mechanical equipment for the manufacture and filling of the container.

It has also been proposed to make a container, such as a bag, of several layers of sheet material having front and rear sides of a thermoplastic material or one which could be heat-welded, with a tear strip of said material welded together with all the sheets forming the bag at the point where the bag should be opened. The bag material, as well as the strip for welding to the bag material, in this case would consist entirely of material which can be heat-sealed, i.e. polyethelene, polypropylene, polyvinyl chloride, cellulose fibres or the like, and the strip is welded to the bag by means of an external weld through all the layers. It has been found that this method of welding on the tear-off strip does not give a satisfactory solution of the problem since, in order to achieve the required seal between all the layers of material, a relatively strong outer weld must be applied, which in turn causes difficulty in opening and an uncontrolled tear. Relatively great initial force must be used with this tear strip and it is thus very easy to acquire a tear which follows an arbitrary and poorly defined path.

It is an object of the present invention to provide a foil or sheet for use in packaging material which provides improved means for tearing the same.

It is an object to provide a foil or sheet which is provided with a reinforced seam of its own material which may be used as the tear strip.

It is also an object of the present invention to provide improved means and method for forming foils with an integral tear strip.

These objects, others and numerous advantages will be set forth and apparent from the following description of the invention.

SUMMARY OF INVENTION

According to the present invention a foil or sheet capable of being used in a variety of packaging applications is folded on itself to form a flap extending from the plane thereof and is welded together along the base line of its fold to form a reinforcing seam which is capable of being easily torn by an upward pull.

Preferably the foil or sheet is made of laminate material having one side of a layer of thermoplastic material which is folded to the inner surfaces of the flap and from which the seam is formed. The foil or sheet can thus be used as the cover side or lid of a package and its edges or perimeter welded to the other portions of the package.

According to the present invention a method and apparatus is provided by which a continuous web or roll of such laminate material can be provided with spaced flaps and tear seams, by passing said web between heat sealing means, and a fold mechanism arranged transversely to each other and interlocked to form the fold and welded seam.

Full details of the present invention follow herein and will be seen in connection with the accompanying drawings.

BRIEF DESCRIPTION OF DRAWINGS

In the accompanying drawings:

FIG. 1 is a plan view of a flexible container made in accordance with the present invention showing the foil or sheet construction, FIG. 2 is a cross sectional view taken along line II—II of FIG. 1, FIG. 3 is an elevational view of rigid container made with the sheet or foil of the present invention, FIG. 4 is a plan view of the container of FIG. 3, FIG. 5 is a sectional view along line V—V of FIG. 4, FIG. 6 is a schematic drawing of apparatus by which the foil or sheet may be made, illustrating also the method thereof, FIG. 7 is a perspective view of a linear package for holding tablets made in accordance with the present invention, and FIG. 8 is a perspective view of a foil or sheet construction made of two separate foils.

The present invention is illustrated in FIGS. 1 and 2 which show a representative container in the form of a bag consisting of two sides 5 and 6 sealed together along their perimetrical edges 1, 2, 3, and 4. Each of the sides 5 and 6 from which the bag is made preferably comprises a foil or sheet having an inner surface made from weldable or permanently sealable material which is otherwise not adhesive or self-sealable and an outer surface 8 of a material desirable and suitable for the particular use to which the container is to be placed. Each foil may be of laminate construction comprising an inner layer for example of thermoplastic material such as polyethylene, polypropylene, P.V.C., and the like, and an outer layer of aluminum, paper, fabric, tin foil, or the like. The laminate may be formed according to conventional procedures in endless rolls or in sheet form. The nature of the laminate, the foil itself, or the particular materials from which it is formed is not critical to the present invention, except that one layer must be readily sealable or weldable into a unitary non separable bond, on application of heat, pressure, or both to it. Thermoplastic resins, synthetic plastic, and similar materials are preferred since they meet this criteria and are in wide use as packaging materials.

In accordance with the present invention one wall of the foil is provided, as seen more clearly in FIG. 2, with a double fold to form a flap 9, in which the weldable surface is located on the inner facing sides and folded on itself. The fold is welded together at its base line to form an inner welded seam 10, completely sealed and non separable. The fold and base line is spaced below the upper edge of the bag at a convenient distance, which is chosen as desired and in conformity with the goods contained in the bag. The fold provides a flap which is manipulated by hand and which can be readily grasped by the user. The size of the fold and the resultant flap is also chosen as desired and needed.

The base line weld 10 forms a reinforced linear area of material which constitutes a controlled tear strip or tear portion, which, while not permitting the fold to be readily separable, permits the entire flap to be torn from the remainder of the foil by an upward pulling force on the flap in a direction angularly to the plane of the foil. The formation of the double fold and thus flap 9 is preferably made before the sides 5 and 6 are sealed about their perimeters. This is so not only because it is more convenient and economical, but because it allows the flap 9 to become an integral part of the package. The flap 9 is permitted to project downwardly and against the surface of the side so that its side edges 9a and 9b may be loosely attached to corresponding edges of the container by the slight amount of plastic compound or sealing material oozing or seeping out from between the foils during the actual sealing of the container perimeter.

When the bag is to be opened, the flap 9 is merely lifted from the surface of the container breaking the loose seal along its edges. It is then obliquely pulled in an upward direction from one edge 2 or 4 to the other edge. Because the base line weld 10 is reinforced and stronger than the surrounding material it does not separate but permits the bag to be torn exactly along a line corresponding to it by pulling on in a direction parallel to the plane of the foil. A controlled and fixed tear is thus obtained, in a bag which is otherwise whole, integral, and without any weakened, scored or preformed tear lines.

As noted the flap may be arranged along the side of the container any distance from the edge. In addition it may be spaced relative to any edge including the vertical ones, in which case the flap could be torn downwardly. It may also be arranged diagonally or obliquely on the face of the foil.

The material for the layers may be arbitrarily chosen. In large measure the contents of the container and means of commercial distribution will dictate the nature of the material. As for example, when an easily openable package for liquid products or moist tissues or comestible is required the inner layer of the foil may be of a thermoplastic resin while the outer layer may be aluminum, or polymer coated paper. Various outer materials in addition to metal foils and paper may be used; fabrics are a good example; synthetic plastics not sensitive to heat is another.

The container seen in FIGS. 1 and 2 may take any configuration and is not limited to the rectangular shape shown. Thus, oval, round, octagonal shapes, to name a few, can be constructed in which one or more of the sides or walls can be made from the laminate foil described. Containers for any goods may be made.

One specific use to which the bag shown in FIG. 1 could be put, is as a container for a tea-bag. The tea-bag itself can be inserted between the two sides and its string or thread passed between the double fold or flap 9 to be held securely by the base line weld 10. Thus, when the flap 9 is torn from the foil, the string will adhere to it and the bag can then be carried and hung in a tea-pot or the like, in conventional manner.

Medicinal products such as sutures, bandages etc., may be packed in sterile condition in a container such as shown in FIGS. 1 and 2 or its variant shapes. Because of the freedom of choice permitted in the materials used the container can be made of inexpensive throw-away design.

Another example of the present invention is shown in FIGS. 3-5 wherein the container is pre-shaped of rigid or semi-rigid material to form a cup or mug 11. Such cups or mugs can be used to hold such diverse goods as foods, such as butter or cream, or items of clothes, hardware, and the like. The cup 11 is covered with a lid 12 sealed to the lip 13 of the cup. In accordance with the present invention, the lid 12 comprises a laminate foil 14 of the nature described previously. Because the foil 14 is formed with an inner layer of weldable material it may easily be sealed along its perimeter to the lip 13 of the cup to form a sealed container. The lid 12 is provided with a flap 9' formed exactly like that shown in FIGS. 1 and 2. The flap 9' extends chordally across the lid 12 and is loosely sealed along its edges to the lip 13 by the oozing of excess thermoplastic material. A base line weld 10 is, of course, provided in the manner of the present invention.

The lid 12 may be made of a foil which is preformed in endless rolls or in sheet form, and be pre-cut to the shape of the cup. It may, of course, be cut during application to the cup. Although, the flap 9' is shown chordally, it may be arcuate or even circular depending on the material of the foil and its mode of manufacture. The straight chordal flap is, of course, less expensive and more easily formed.

Reference to FIG. 6 is now made for an exposition of a method and apparatus for forming foil material with flaps having base line welds according to the present invention. The illustrated method and apparatus is intended to provide a substantially endless reel of laminate with defined spaced lengths of foil having flaps at given intervals extending transversely of its lengths. The laminate material or foil 6 previously indicated, is not critical, however, the method and apparatus illustrates the formation of flap by heat welding a foil having one surface 7 of thermoplastic material which is otherwise not adhesive or self-sealable. The foil is provided as an endless reel 15 which may be mounted on a free running shaft or mandrel. The lead end of the foil 6 with the weldable side 7 facing upwards is passed through a pair of opposed feed rollers 16 and 17 which may be driven by suitable motors and control devices including interval timers, to pull the foil 6 at fixed adjustable intervals along a straight path indicated by the arrows B to pass a heat sealing means 18 and associate collet jaw 19. The heat sealing means comprises an electric heater unit 18a powered from a source, not illustrated, and the collet jaw 19 includes an anvil 19a. The heat sealing means 18, heater unit 18a, collet jaw 19 and the anvil 19a are movable unitarily or individually along the path B. Mounted above the heating means 18 and the collet jaw 19 is a fold bar 20 which is actuated to reciprocate in timed intervals along a vertical path A to push a length corresponding to fold 9 between means 18 and the jaw 19. The heating fold bars may be a solenoid and movable core operated by a time electrical pulse from a source not shown. A clamping means 21 is also provided which prevents the material 6 from moving backward after it is pushed between the heating means and collet jaw. The clamping means may comprise a pivoted finger engaging the material 6, an additional roller or solenoid actuated jaws. Other means are also possible.

In operation, the rolls 16 and 17 pull a length of material from the reel 15 for a given interval to the heating means 18, at which time the rolls may be stopped and the bar 20 pushed downwardly. The bar 20 causes a fold in the material of given length which is captured between the heating means 18 and collet jaws by the rolls 16 and 17 and the clamp 21. The heating means 18 and 19 are then moved together to heat seal a narrow strip of the fold along a weld line as described earlier. The heating unit and jaws are relaxed and the cycle repeated until the entire reel is provided with spaced folds 9 having welds 10 along the base line. The rollers 16 and 17 may be provided with pressure means and/or cooling means to insure proper formation of the weld.

A further embodiment of the invention is shown in FIG. 7. This embodiment relates to the formation of a dispensing package for prescribed doses or quantities of such items as medicines or the like. Generally the package resembles that shown in U.S. Pat. No. 3,214,013, issued Oct. 26, 1965 to Marcus Diamant; particularly, FIG. 4, thereof. The package comprises a laminate structure 22 which consists of a single web 23 in which is formed a longitudinal series of pockets or capsule-like containers 24 in which a tablet 25 or similar dose of an article is located. Preferably, the web 23 is made of transparent plastic strip material which is bendable or flexible, although it may be made of any other suitable material. In the aforementioned patent each of the pockets 24 would have been covered by individual web-like covers, which would have been only partially sealed to the web 23, leaving a portion free as a pull tab. According to the present invention, however, a continuous strip of foil 6″ in which are formed a plurality of folds or flaps 9″ having welds 10″ is sealed or adhered to the face of the web 23 to cover all the pockets 24. The strip of foil 9″ is preferably of the same length and width as the web 23, although it need only be dimensioned to cover the pockets 24 with sufficient overlap to permit effective permanent sealing. Further, according to the present invention, each base line or weld 10″ is located to pass substantially through the center of an associated pocket 24. That is, each pocket 24 is provided with its own flap 9″, the base line weld 10″ of which diametrically crosses the pocket. In this manner any of the pockets 24 can be opened and readily evacuated of its tablet or dose by merely tearing the foil 6″ along the respective weld by the respective flap. Only one pocket is thus openable at any one time. Of course, multiple pockets may be successively opened.

Another example of the present invention is shown in FIG. 8, wherein the fold is made by sealing the end portion 26 of a first foil 31 to the end portion 27 of a second foil 28. Said foils 31 and 28 may for example consist of a laminate construction comprising an inner layer of thermoplastic material such as polyethylene, polypropylene, P.V.C., and the like and an outer layer of aluminum, paper, fabric, tin foil, or the like. In order to form a flap 29 the foils 31 and 28 are placed with their thermoplastic sides facing each other and are then welded together on the inner facing sides along the base line 30 of said flap to form a reinforcing sealed seam along which said sealed sheet construction may be torn by a pulling force in a direction away from the plane of said sheet or foil. In this way a flap 29 is formed which projects from the non-thermoplastic side of the resulting sheet construction, this flap 29 consisting of the free edges of the two foils 31, 28. If desired, of course, these edges may be welded together to form a homogenous flap.

The foil 6″ is essentially the same as that previously described and preferably comprises an inner thermoplastic layer and an outer aluminum layer for strength. It is made in the manner described in accordance with FIG. 6.

It will thus be seen that the present invention provides a foil having an easily tearable and separable seal which may be used in many shapes and configurations and in many applications. It is apparent that while the present invention has been shown in a few embodiments, numerous changes and modifications can still be made. The present disclosure should, therefore, be taken as illustrative only and not limiting of the invention.

What I claim is:

1. A package comprising two planar laminated sheets each having a layer of thermoplastic material combined with a second layer of non-thermoplastic material, the sheets being joined together by face-to-face heat sealing of their respective thermoplastic layers at the perimetral edges of the two sheets, one of said sheets being folded over itself along a base line parallel to and substantially spaced from an edge of said sheet to form a flap free of the surface of said sheet and welding together two portions of its internal thermoplastic layer along the peripheral edges and base line of said fold to form a seam along which said one sheet may be torn in two and said package opened by pulling the flap and adhering portion of said one sheet away from the other sheet, leaving the remaining portion of said one sheet attached to the other of said two sheets.

* * * * *